March 14, 1967     S. WAXELBAUM     3,308,518
CLAMP FOR PILES OF CLOTH AND OTHER RESILIENT MATERIAL
Filed March 24, 1965     2 Sheets-Sheet 1
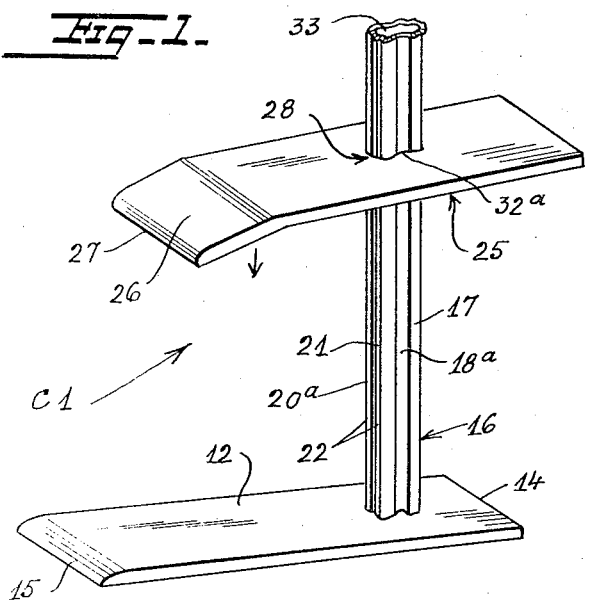
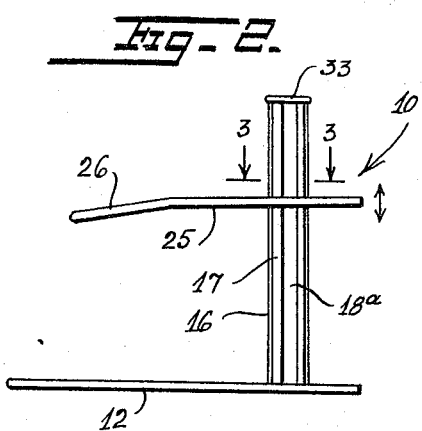
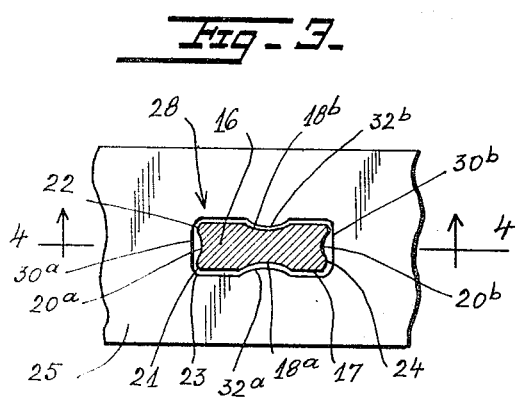
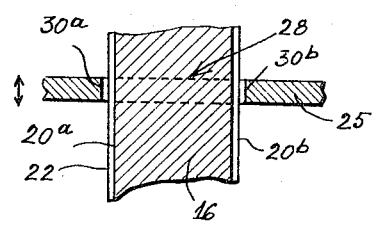
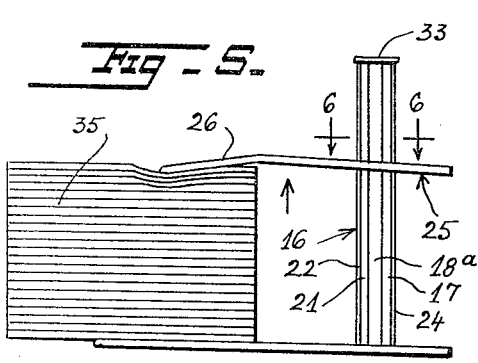
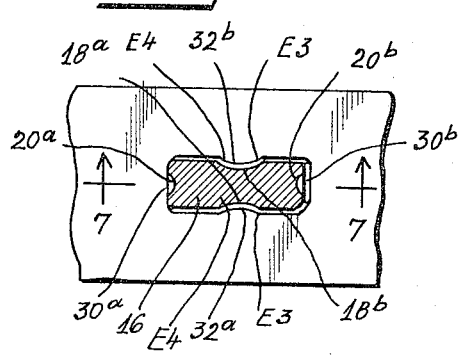
INVENTOR
Sidney Waxelbaum
BY
Polachek & Saulsbury
ATTORNEYS.

March 14, 1967 S. WAXELBAUM 3,308,518
CLAMP FOR PILES OF CLOTH AND OTHER RESILIENT MATERIAL
Filed March 24, 1965 2 Sheets-Sheet 2
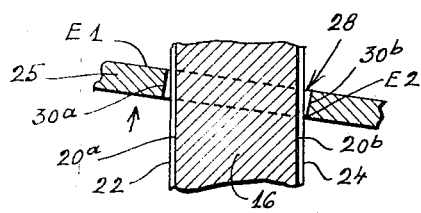
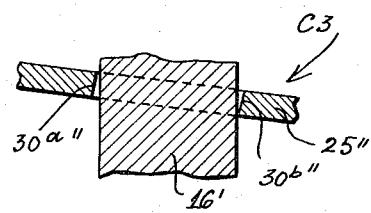
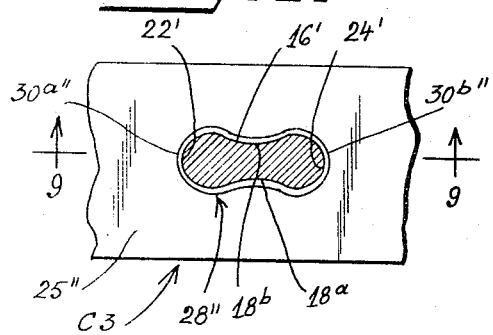
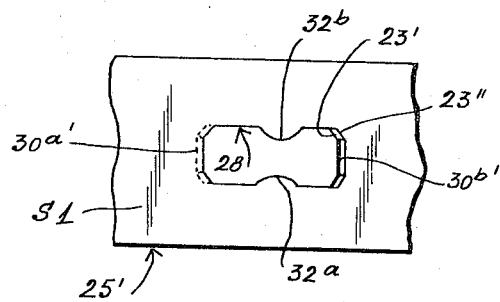
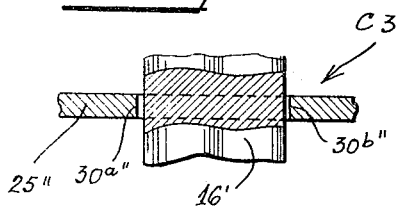
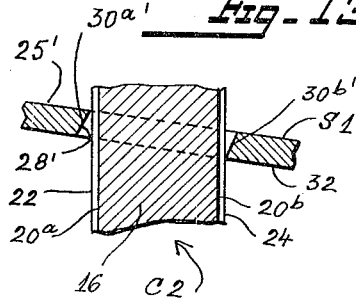
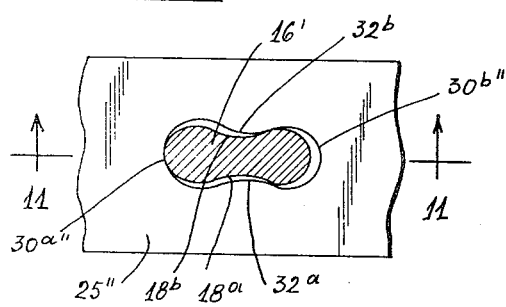
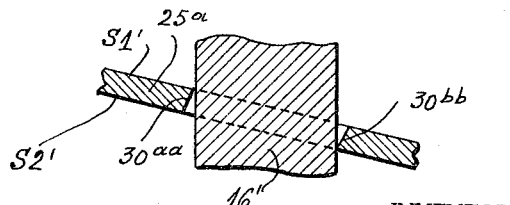
INVENTOR
Sidney Waxelbaum
BY Polachek & Saulsbury
ATTORNEYS.

United States Patent Office 3,308,518
Patented Mar. 14, 1967

3,308,518
CLAMP FOR PILES OF CLOTH AND OTHER
RESILIENT MATERIAL
Sidney Waxelbaum, Flushing, N.Y.
(821 Broadway, New York, N.Y. 10003)
Filed Mar. 24, 1965, Ser. No. 442,271
5 Claims. (Cl. 24—263)

Heretofore cloth clamps have involved use of clamping springs, screw bolts or other like devices. The present invention involves a clamp having stationary and movable jaws. The movable jaw is fitted on a vertical bar which extends through a hole in the movable jaw and locks frictionally to the vertical bar when the movable jaw is canted or tilted. The vertical bar is noncircular in cross section so that the rim of the hole in the movable jaw engages on the bar at a multiplicity of points.

It is therefore the principal object of the invention to provide a clamp for a pile of cloth or the like, having only a single movable part in the form of a tempered steel jaw with a noncircular hole, the jaw being movably engaged on a vertical bar for adjustment of the jaw, the bar having a noncircular cross section shaped so that the rim of the hole in the jaw engages on the bar at a multiplicity of points for locking the jaw at a selected position on the bar.

Another object is to provide a clamp as described in which use of auxiliary springs, screw bolts, and the like is avoided.

Still another object is to provide an improved clamp as described which provides a smooth, firm locking action whose gripping force increases under load, which is very durable in construction, relatively inexpensive to manufacture, and which grips uniformly so that distortion of materials and goods gripped by the clamp is avoided.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of a clamp embodying the invention.

FIG. 2 is a reduced side view of the clamp with movable jaw shown in unlocked position.

FIG. 3 is a horizontal fragmentary sectional view on an enlarged scale taken on line 3—3 of FIG. 2.

FIG. 4 is a fragmentary vertical sectional view taken on line 4—4 of FIG. 3.

FIG. 5 is a reduced side view of the clamp with movable jaw shown in locked position and with a pile of goods gripped between jaws of the clamp.

FIG. 6 is an enlarged fragmentary sectional view taken on line 6—6 of FIG. 5.

FIG. 7 is a fragmentary vertical sectional view taken on line 7—7 of FIG. 6.

FIG. 8 is a sectional view similar to FIG. 3 of another clamp with movable jaw in unlocked position.

FIG. 9 is a fragmentary vertical sectional view taken on line 9—9 of FIG. 8.

FIG. 10 is a sectional view similar to FIG. 6 showing the clamp of FIGS. 8 and 9, with movable jaw in locked position.

FIG. 11 is a fragmentary sectional view taken on line 11—11 of FIG. 10.

FIG. 12 is a plan view of part of a movable jaw of still another clamp.

FIG. 13 is a fragmentary sectional view similar to FIG. 7 of a clamp employing the movable jaw of FIG. 12.

FIG. 14 is a sectional view similar to FIG. 11 showing another clamp and jaw construction.

Referring first to FIGS. 1–7, there is shown a first clamp C1 including a rectangular substantially flat base plate which serves as a stationary first jaw 12 of the clamp. The jaw has a rounded or beveled front edge 15. Welded or otherwise secured to jaw 12 and extending perpendicularly upwardly therefrom near its rear edge 14 is a vertical post or bar 16. This bar is noncircular in cross section and preferably is polygonal. It is actually generally rectangular in cross section with two vertical channels or grooves 18a, 18b formed in opposite wider sides 17 thereof and with two vertical channels or grooves 20a, 20b formed in opposite front and rear sides thereof. Corners 21 of the bar may be beveled to form long, narrow vertical lands. Narrow, flat vertical lands 22, 24 are defined at the opposite narrow sides of the bar between the grooves 20a, 20b respectively and the beveled corner lands 21.

A movable second jaw 25 is provided for the clamp. This jaw is a generally rectangular plate which is shorter than jaw 12. The jaw is bent downwardly at its forward edge to define a broad tooth 26 with rounded front edge 27. The jaw 25 has a hole 28 offset toward its rear edge 29. This hole is generally similar in shape to the cross section of bar 16, as clearly shown in FIG. 3. The hole 28 has a rim with straight parallel ends 30a, 30b. The wider side edges of the rim are formed with convexities or projections 32a, 32b centrally located and extending into grooves 18a, 18b.

When jaw 25 is horizontal as shown in FIGS. 2, 3 and 4, it slides freely up and down the bar 16. The bar 16 may be peened at its upper end 33 to prevent the jaw 25 from coming off of the bar. When a pile of cloth or other resilient material 35 is placed on lower jaw 12, the raised jaw 25 can be pressed down on the pile. Manual downward pressure exerted on tooth 26 will depress the pile slightly. When the jaw 25 is then manually released, the jaw will cant or tilt upwardly clockwise as viewed in FIG. 5. This will cause frictional engagement of parts of the rim of hole 28 with parts of the bar. As best shown in FIGS. 6 and 7 the two flat front lands 22 of the bar 16 are engaged by the upper edge E1 of the front end 30a of hole 28. The lower edge E2 of the rear end 30b of hole 28 engages on the two rear lands 24. At the same time two upper points E3 of the rearward edges of projections 32a, 32b engage at rear portions of grooves 20a, 20b respectively and two lower points E4 of projections 32a, 32b engage at forward edges of grooves 18a, 18b. The movable jaw is thus engaged in an eight-point frictional grip or lock with the bar. The force of engagement increases as the upward pressure of the load applied by the expanding pile of material 35 increases. The eight-point engagement will not slip. Nevertheless the movable jaw can be quickly disengaged from the locking position by pushing down on the forward portion of the jaw 25 to tilt it counterclockwise as viewed in FIG. 5. This will relieve the eight-point grip on bar 16 and the jaw 25 can then be moved freely up the bar to release the pile of material 35. Hole 28 may have four corner bevels 23 which oppose and engage beveled lands 21 so that the jaw will exert a twelve-point grip on the bar 16.

FIGS. 12 and 13 show another clamp C2 which is similar to clamp C1, and corresponding parts are identically numbered. The bar 16 is identical to bar 16 of clamp C1. The movable jaw 25' is similar to jaw 25 except that the ends 30a', 30b' of holes 28' are beveled with respect to top and bottom surfaces S1, S2 of the jaw rather than being perpendicular thereto as in jaw 25. The front end 30a' defines an acute angle with the upper surface S1 of the jaw 25' and the rear end 30' defines an acute angle with the lower surface S2 of jaw 25'. Bevels 23' may also have faces 28'' inclined to surfaces S1, S2.

Jaw 25' grips bar 16 with the same eight-point grip described above, but a stronger biting grip is effected by the sharp points defined between angled ends of the hole 28' and the flat upper and lower surfaces of the jaw.

FIGS. 8–11 show another clamp C3 which is substantially the same as clamp C1 and corresponding parts are identically numbered. Ends 22', 24' of the bar 16' are cylindrically curved and smoothly continuous with the concave grooves 18a, 18b in the wider sides of the bar. The hole 28" in bar 25" is correspondingly shaped with concave front and rear edges 30a", 30b". This arrangement provides a longer line of engagement at each end of the hole 28" than is obtained with holes 28 and 28'. There is a four-point engagement at the sides of the bar in the same manner as obtained with jaws 25 and 25' and in addition a two-line engagement at opposite front and rear sides of the bar. Release of jaw 25" is effected in the same rapid manner as for jaws 25, 25'.

FIG. 14 shows clamp C4 which is the same as clamp C3 except that the front and rear concave edges 30aa and 30bb are inclined at angles to the top and bottom surfaces S1', S2' of the jaw 25a in the same manner as in jaw 25'. The jaw 25a thus has a four-point side grip where the projections 32a, 32b engage the grooves 20a, 20b and in addition two line grips are obtained at the front and rear narrow sides of the bar 16'.

It is preferred that the parts of the clamps described be made of tempered steel, preferably coated or treated to have a rust proof, non-glare finish. The clamp will be very strong in consrtuction, safe and sure in operation and very easy to use. It can be manufactured relatively economically by known metal working processes and machinery.

While I have illustrated and described the preferred embodiments of my invention, it is to be understod that I do not limit myself to the precise constructions herein disclosed and that various changes and modifications may be made within the scope of the invention as defined in the appended claims.

What is claimed is:

1. A clamp for resilient material, comprising a base plate defining a stationary first jaw, a bar secured to and extending upwardly from said plate, said bar being noncircular in cross section, said bar having wider opposite sides generally parallel to edges of said base plate and having narrower opposite front and rear sides extending generally transverse to the edges of the base plate, and a second jaw movably mounted on said bar, said second jaw having a downwardly inclined forward portion defining a tooth extending for the entire width of the second jaw, said second jaw having a generally rectangular rear portion with a centrally located hole therein, said wider sides of the bar having centrally located opposing vertical grooves therein, said hole having a rim with convex inwardly extending opposing projections slidably engaged in said grooves, respectively, whereby when the second jaw is tilted on the bar, said projections engage with said grooves at two upper rear points and two lower front points of the projections, the narrower front side of the bar having a third vertical groove therein with two flat vertical lands at opposite edges of the third groove, the narrower rear side of the bar having a fourth vertical groove therein with two other flat vertical lands at opposite edges of the fourth groove, whereby the front and rear edge portions of the hole engage the bar at four points, so that the second jaw grips the bar at eight points in all.

2. A clamp for resilient material, comprising a base plate defining a stationary first jaw, a bar secured to and extending upwardly from said plate, said bar being noncircular in cross section, said bar having wider opposite sides generally parallel to edges of said base plate and having narrower opposite front and rear sides extending generally transverse to the edges of the base plate, and a second jaw movably mounted on said bar, said second jaw having a downwardly inclined forward portion defining a tooth extending for the entire width of the second jaw, said second jaw having a generally rectangular rear portion with a centrally located hole therein, said wider sides of the bar having centrally located opposing vertical grooves therein, said hole having a rim with convex inwardly extending opposing projections slidably engaged in said grooves, respectively, whereby when the second jaw is tilted on the bar, said projections engage with said grooves at two upper rear points and two lower front points of the projections, the narrower front side of the bar having a third vertical groove therein with two flat vertical lands at opposite edges of the third groove, the narrower rear side of the bar having a fourth vertical groove therein with two other flat vertical lands at opposing edges of the fourth groove, whereby the front and rear edge portions of the hole engage the bar at four points, so that the second jaw grips the bar at eight points in all, the front and rear edges of said rim being angularly disposed to flat, parallel top and bottom surfaces of the second jaw, the front edge of the rim being disposed at an acute angle to the said top surface, and the rear edge of the rim being disposed at an acute angle to said bottom surface, to produce a biting-in effect of said end edges of the rim on the narrow sides of the bar.

3. A clamp for resilient material, comprising a base plate defining a stationary first jaw, a bar secured to and extending upwardly from said plate, said bar being noncircular in cross section, said bar having wider opposite sides generally parallel to edges of said base plate and having narrower opposite front and rear sides extending generally transverse to the edges of the base plate, and a second jaw movably mounted on said bar, said second jaw having a downwardly inclined forward portion defining a tooth extending for the entire width of the second jaw, said second jaw having a generally rectangular rear portion with a centrally located hole therein, said wider sides of the bar having centrally located opposing vertical grooves therein, said hole having a rim with convex inwardly extending opposing projections slidably engaged in said grooves, respectively, whereby when the second jaw is tilted on the bar, said projections engage with said grooves at two upper rear points and two lower front points of said projections, and the upper front edge portion and lower rear edge portion of the rim engage at the front and rear sides, respectively, of the bar, said narrow sides of the bar being cylindrically convexedly curved, said end edges of said hole being correspondingly concavely curved to correspond with the curvature of the narrow sides of the bar.

4. A clamp for resilient material, comprising a base plate defining a stationary first jaw, a bar secured to and extending upwardly from said plate, said bar being noncircular in cross section, said bar having wider opposite sides generally parallel to edges of said base plate and having narrower opposite front and rear sides extending generally transverse to the edges of the base plate, and a second jaw movably mounted on said bar, said second jaw having a downwardly inclined forward portion defining a tooth extending for the entire width of the second jaw, said second jaw having a generally rectangular rear portion with a centrally located hole therein, said wider sides of the bar having centraly located opposing vertical grooves therein, said hole having a rim with convex inwardly extending opposing projections slidably engaged in said grooves, respectively, whereby when the second jaw is tilted on the bar, said projections engage with said grooves at two upper rear points and two lower front points of said projections, and the upper front edge portion and lower rear edge portion of the rim engage at the front and rear sides, respectively, of the bar, said narrow sides of the bar being cylindrically convexedly curved, said end edges of said hole being correspondingly concavely curved to correspond with the curvature of the narrow sides of the bar, the front and rear edges of said rim being angularly disposed to flat, parallel top and bottom surfaces of the second jaw, the front edge of the rim being disposed at an acute angle to the said top surface, and the rear edge of the rim being disposed at an acute angle to said bottom surface, to produce a biting-in effect of said end edges of the rim on the narrow sides of the bar.

5. A clamp for resilient material, comprising a base plate defining a stationary first jaw, a bar secured to and extending upwardly from said plate, said bar being noncircular in cross section, said bar having wider opposite sides generally parallel to edges of said base plate and having narrower opposite front and rear sides extending generally transverse to the edges of the base plate, and a second jaw movably mounted on said bar, said second jaw having a downwardly inclined forward portion defining a tooth extending for the entire width of the second jaw, said second jaw having a generally rectangular rear portion with a centrally located hole therein, said wider sides of the bar having centrally located opposing vertical grooves therein, said hole having a rim with convex inwardly extending opposing projections slidably engaged in said grooves, respectively, whereby when the second jaw is tilted on the bar said projections engage with said grooves at two upper rear points and two lower front points of the projections, the narrower front side of the bar having a third vertical groove therein with two flat vertical lands at opposite edges of the third groove, the narrower rear side of the bar having a fourth vertical groove therein with two other flat vertical lands at opposite edges of the fourth groove, whereby the front and rear edge portions of the hole engage the bar at four points, said bar having four vertical corner beveled lands at junctions of the narrow and wider sides of the bar, said hole having four other corner bevels adjacent the beveled lands of the bar, so that the second jaw grips the bar at twelve points in all.

References Cited by the Examiner

UNITED STATES PATENTS

| 237,431 | 2/1881 | Colt. |
| 248,949 | 11/1881 | Pope. |
| 986,069 | 3/1911 | Kohlhass. |
| 2,249,651 | 7/1941 | Gilbert _____ 24—263 |

FOREIGN PATENTS

| 392,627 | 5/1933 | Great Britain. |

WILLIAM FELDMAN, *Primary Examiner.*

DONALD A. GRIFFIN, *Examiner.*